United States Patent
Trinh et al.

(10) Patent No.: US 6,924,821 B2
(45) Date of Patent: Aug. 2, 2005

(54) PROCESSING PIPELINE RESPONSIVE TO INPUT AND OUTPUT FRAME RATES

(75) Inventors: Stephane Trinh, Montreal (CA); Michel Gaudette, Montreal (CA)

(73) Assignee: Autodesk Canada Inc., Montreal (CA)

( * ) Notice: Subject to any disclaimer, the term of this patent is extended or adjusted under 35 U.S.C. 154(b) by 501 days.

(21) Appl. No.: 09/790,066

(22) Filed: Feb. 21, 2001

(65) Prior Publication Data

US 2002/0051005 A1 May 2, 2002

(30) Foreign Application Priority Data

Apr. 1, 2000 (GB) .............................. 0007974

(51) Int. Cl.$^7$ ................................ G09G 5/00
(52) U.S. Cl. ................................... 345/629
(58) Field of Search ................ 345/619, 558, 345/629, 473, 428, 474, 475, 506; 348/443, 459; 386/52; 352/131

(56) References Cited

U.S. PATENT DOCUMENTS

| | | | | |
|---|---|---|---|---|
| 4,198,656 A | * | 4/1980 | Mathisen | 348/159 |
| 4,357,624 A | * | 11/1982 | Greenberg | 348/578 |
| 4,498,079 A | * | 2/1985 | Ghosh et al. | 463/33 |
| 4,524,421 A | | 6/1985 | Searby et al. | 345/594 |
| 4,538,188 A | * | 8/1985 | Barker et al. | 386/54 |
| 4,558,302 A | | 12/1985 | Welch | 341/51 |
| 4,602,286 A | | 7/1986 | Kellar et al. | 348/597 |
| 4,641,255 A | | 2/1987 | Hohmann | 345/628 |
| 4,709,277 A | * | 11/1987 | Ninomiya et al. | 386/52 |
| 4,758,892 A | * | 7/1988 | Bloomfield | 348/585 |
| 4,823,108 A | | 4/1989 | Pope | 345/806 |
| 4,855,927 A | | 8/1989 | Seki et al. | 700/187 |
| 4,860,217 A | | 8/1989 | Sasaki et al. | 345/653 |
| 4,908,700 A | | 3/1990 | Ishii et al. | 348/587 |
| 5,077,610 A | | 12/1991 | Searby et al. | 348/593 |
| 5,119,309 A | | 6/1992 | Cavendish et al. | 700/182 |
| 5,191,427 A | * | 3/1993 | Richards et al. | 348/97 |
| 5,212,544 A | | 5/1993 | Kellar et al. | 348/590 |

(Continued)

FOREIGN PATENT DOCUMENTS

| | | |
|---|---|---|
| CA | 2066989 | 4/1992 |
| EP | 0 360 576 A | 3/1990 |
| EP | 0 360 599 A2 | 3/1990 |
| EP | 0 589 658 A2 | 3/1994 |
| EP | 0 593 028 A1 | 4/1994 |
| EP | 0 776 136 A | 11/1995 |
| GB | 2 262 860 A | 3/1993 |
| GB | 2 270 439 A | 9/1994 |
| GB | 2 312 348 A | 10/1997 |
| WO | WO 96/07979 | 3/1996 |
| WO | WO 98/10586 | 3/1998 |
| WO | WO 98/11510 | 3/1998 |
| WO | WO 98/11512 | 3/1998 |

OTHER PUBLICATIONS

Atari World, "Moving Pictures . . . True–colour morphing and animation can by yours . . . Apex–Media," Oct. 1995, 2 pages.
Apex Media, Feb. 1998, 5 pages.

*Primary Examiner*—Michael Razavi
*Assistant Examiner*—Ryan Yang
(74) *Attorney, Agent, or Firm*—Gates & Cooper LLP

(57) ABSTRACT

An image processing system processes image data in response to a sequence of image processing steps defined by a process tree (800). The process tree comprises a plurality of interconnected nodes (801–813), including input nodes (801–804) and at least one output node (813). Output rendering is performed a frame at a time, and a frame requirement (824) is passed from the output node to previous nodes (812, 811, 810). Intermediate nodes include requirement processing (823) such that a node (810) having different input and output frame rates can identify and generate a requirement (825) for the input frames (826) as it requires for its processing (821).

33 Claims, 15 Drawing Sheets

U.S. PATENT DOCUMENTS

| | | | |
|---|---|---|---|
| 5,216,755 A | | 6/1993 | Walker et al. ............... 345/591 |
| 5,260,787 A | * | 11/1993 | Capitant et al. ............ 348/459 |
| 5,289,566 A | | 2/1994 | Walker et al. ............... 345/592 |
| 5,353,391 A | * | 10/1994 | Cohen et al. ................ 345/619 |
| 5,355,174 A | | 10/1994 | Mishima .................... 348/592 |
| 5,359,430 A | | 10/1994 | Zhang ....................... 358/3.13 |
| 5,384,667 A | | 1/1995 | Beckwith ..................... 386/55 |
| 5,398,120 A | | 3/1995 | Friedman et al. ........... 358/501 |
| 5,428,723 A | | 6/1995 | Ainscow et al. ............. 345/634 |
| 5,430,878 A | | 7/1995 | Straub et al. ................ 717/162 |
| 5,434,958 A | | 7/1995 | Surma et al. ................ 345/632 |
| 5,442,751 A | | 8/1995 | Patrick et al. ................. 349/59 |
| 5,455,600 A | | 10/1995 | Friedman et al. ........... 345/597 |
| 5,459,529 A | | 10/1995 | Searby et al. ............... 348/586 |
| 5,508,940 A | | 4/1996 | Rossmere et al. .......... 345/723 |
| 5,535,137 A | | 7/1996 | Rossmere et al. .......... 358/537 |
| 5,592,599 A | | 1/1997 | Lindholm .................... 345/427 |
| 5,592,609 A | | 1/1997 | Suzuki et al. ............... 345/473 |
| 5,598,182 A | | 1/1997 | Berend et al. .............. 345/619 |
| 5,657,095 A | * | 8/1997 | Yoshida et al. ............. 348/584 |
| 5,675,753 A | * | 10/1997 | Hansen et al. .............. 345/744 |
| 5,706,417 A | * | 1/1998 | Adelson ...................... 345/640 |
| 5,708,767 A | * | 1/1998 | Yeo et al. ................... 345/440 |
| 5,719,640 A | | 2/1998 | Gehrmann ................. 348/587 |
| 5,838,331 A | * | 11/1998 | DeBry ........................ 345/584 |
| 5,892,506 A | * | 4/1999 | Hermanson .............. 715/500.1 |
| 5,895,474 A | * | 4/1999 | Maarek et al. .............. 715/514 |
| 5,982,350 A | * | 11/1999 | Hekmatpour et al. ........ 345/629 |
| 6,052,109 A | | 4/2000 | Sevigny ...................... 345/646 |
| 6,081,264 A | * | 6/2000 | Rosen et al. ................ 345/723 |
| 6,108,047 A | * | 8/2000 | Chen .......................... 348/581 |
| 6,130,676 A | * | 10/2000 | Wise et al. .................. 345/619 |
| 6,133,914 A | * | 10/2000 | Rogers et al. .............. 345/661 |
| 6,137,920 A | * | 10/2000 | Mead ......................... 382/294 |
| 6,147,695 A | * | 11/2000 | Bowen et al. ............. 345/503 |
| 6,204,840 B1 | * | 3/2001 | Petelycky et al. ....... 715/500.1 |
| 6,263,496 B1 | * | 7/2001 | Meyer et al. ............... 717/114 |
| 6,285,661 B1 | * | 9/2001 | Zhu et al. ................... 370/260 |
| 6,317,131 B2 | * | 11/2001 | Basso et al. ................ 345/474 |
| 6,337,916 B1 | * | 1/2002 | Boyd et al. ................. 382/103 |
| 6,348,935 B1 | * | 2/2002 | Malacinski et al. ......... 345/853 |
| 6,348,953 B1 | * | 2/2002 | Rybczynski ................ 348/584 |
| 6,407,775 B1 | * | 6/2002 | Frink et al. ................. 348/443 |
| 6,414,686 B1 | * | 7/2002 | Protheroe et al. .......... 345/474 |
| 6,445,419 B1 | * | 9/2002 | Sanpei ....................... 348/443 |
| 6,487,361 B2 | * | 11/2002 | Galt et al. .................... 386/52 |
| 6,522,331 B1 | * | 2/2003 | Danks ........................ 345/473 |
| 6,581,102 B1 | * | 6/2003 | Amini et al. ................ 709/231 |
| 6,618,547 B1 | * | 9/2003 | Peters et al. ................. 386/52 |
| 6,631,240 B1 | * | 10/2003 | Salesin et al. ................ 386/68 |
| 6,657,637 B1 | * | 12/2003 | Inagaki et al. .............. 345/629 |
| 6,753,878 B1 | * | 6/2004 | Heirich et al. .............. 345/629 |
| 2001/0029505 A1 | * | 10/2001 | Gaudette et al. ............ 707/102 |
| 2001/0030647 A1 | * | 10/2001 | Sowizral et al. ............ 345/420 |
| 2002/0018640 A1 | * | 2/2002 | Bolduc ........................ 386/52 |
| 2002/0030694 A1 | * | 3/2002 | Ebihara et al. ............. 345/634 |
| 2002/0136293 A1 | * | 9/2002 | Washino ................ 375/240.01 |
| 2002/0171765 A1 | * | 11/2002 | Waki et al. ................. 348/589 |

* cited by examiner

PROCESSING PIPELINE RESPONSIVE TO INPUT AND OUTPUT FRAME RATES

BACKGROUND OF THE INVENTION

1. Field of the Invention

The present invention relates to processing image data in response to data structure defining a sequence of image processing, and in particular relates to processing image data at multiple frame rates.

2. Description of the Related Art

Systems for the processing of image data have historically required multiple processing steps in order to combine several clips into a single composited scene. Examples of this technique are where several moving images, for example models of spaceships, are superimposed upon a background that comprises actors, and maybe several items of computer-generated artificial scenery.

More recently, it has become possible to composite scenes of considerable complexity by defining complex sequences of effects, and other types of image processing in a data structure called a process tree. This data structure is interpreted by a computer to render an output clip on a frame-by-frame basis, rather than by generating multiple intermediate clips.

A process tree typically has several inputs, and an output. A frame supplied at an input is processed according to process nodes connected between the input and the output. A process node may combine frames from a plurality of sources. A process tree may contain hundreds of such processing nodes, and thereby achieve remarkable realism when compositing scenes of an artificial nature.

When intermediate clips have to be generated, this prevents the results of processing from being previewed interactively. This way of working is extremely time consuming and expensive. The process tree takes from less than a second to several minutes to render, depending on the complexity of interconnected processes, but nevertheless the results of changes made in the processing tree can be seen relatively quickly, thereby making this an extremely productive method of working.

A process tree is interpreted by the image processing system to define a processing pipeline, through which images propagate a frame at a time, in order to generate each requested output frame. However, this frame-by-frame approach restricts the connected processes to those that have an input frame rate that precisely matches the output frame rate. Standards conversion processing, and timewarp processing must be performed using conventional techniques, using intermediate clips. This limitation reduces the value of the process tree method, particularly in image processing environments where there is an increasing requirement to perform image processing upon mixed format image data.

BRIEF SUMMARY OF THE INVENTION

According to an aspect of the present invention, there is provided apparatus for processing image data comprising frame storage means for storing image data, memory means for storing instructions and a data structure representing processing to be performed on image data in said frame storage means, processing means for performing said image processing, said instructions defining a sequence of operations to be performed in order to process frames of said image data in a sequence of operations defined by said data structure, wherein said data structure comprises an output node, at least one input node for receiving frames from said frame storage means, and a plurality of connected process nodes that request frames from other nodes by specifying a frame requirement; and said processing means is configured by said instructions to generate an output frame by performing the following steps with respect to each process node: (1) receiving an output frame requirement; (2) in response to said output frame requirement, identifying an input requirement also responsive to a ratio of frame input/output rates, when this ratio is other than unit; and (3) processing an input frame in response to a validation of said input requirement.

BEST MODE FOR CARRYING OUT THE INVENTION

The invention will now be described by way of example only with reference to the accompanying drawings.

Figure 1:
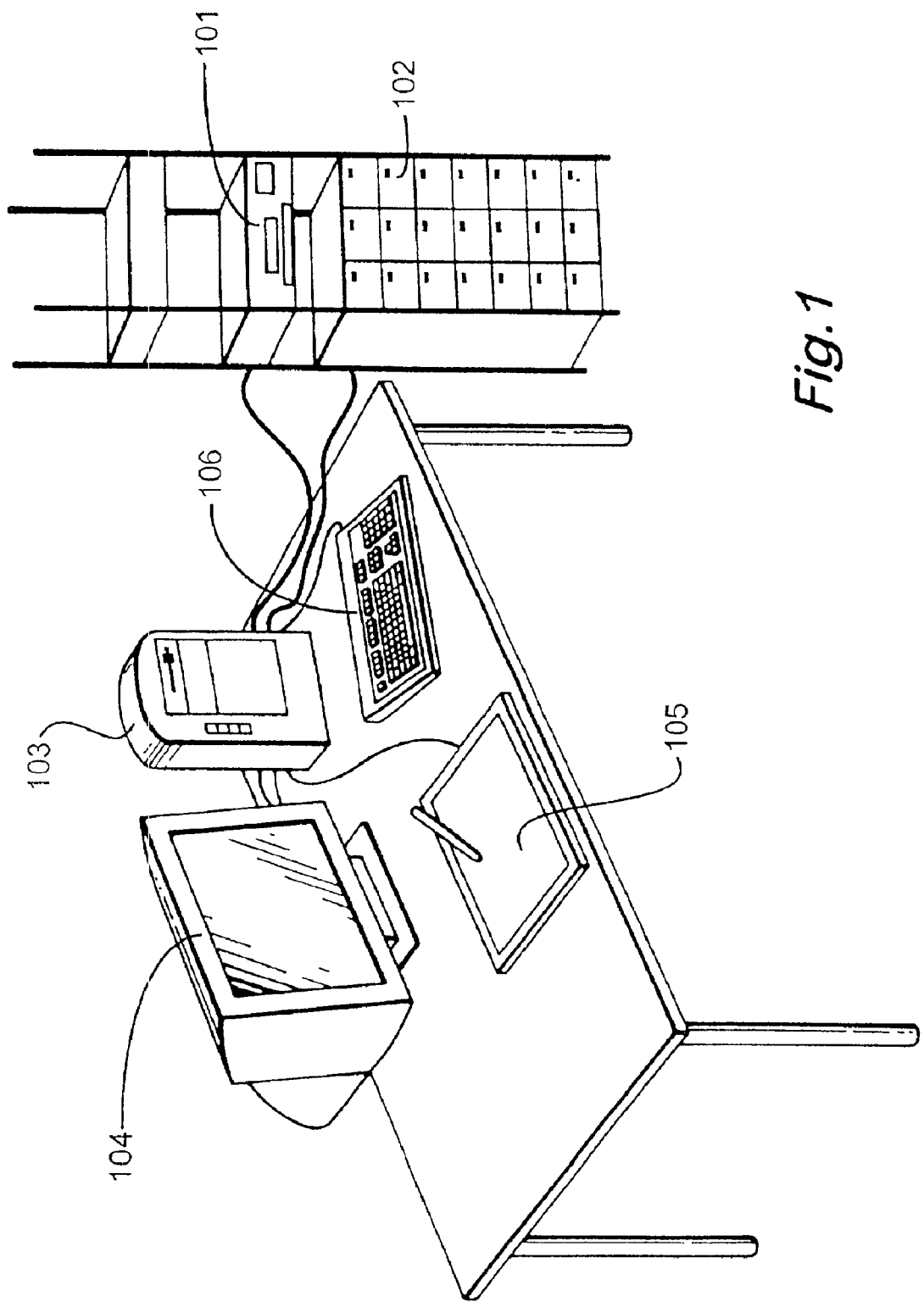
FIG. 1 shows an image processing system, including a frame store, a computer and a monitor.

A system for the processing of image data is illustrated in FIG. 1. A digital tape player 101 plays and records digital tapes having a high data capacity suitable for storing many frames of high definition image data. In preparation for image processing, images for a film clip are transferred from a tape in the tape player 101 to a frame store 102. The frame store 102 comprises several high capacity hard disk drives, arranged to supply and store image data in parallel across many individual drives at once. The hard disk drives are configured as a redundant array of inexpensive disks (RAID). Using the frame store 102, it is possible to play back and record high resolution film or video images at any location in a clip without having to wait for a tape wind mechanism to reach the required frame.

A computer 103 facilitates the transfer of image data between the tape player 101 and the frame store 102. The computer 103 also facilitates the modification, processing and adjustment of data to form an output clip that will eventually be stored onto digital tape. The computer is a Silicon Graphics Octane (TM). Images are previewed on a monitor 104 on which is also displayed a graphical user interface (GUI) to provide the user with controls and interfaces for controlling the manipulation of image data. When processing image data, the user interacts with images and the graphical user interface displayed on the monitor 104 via a graphics tablet 105. For alphanumeric input, there is provided a keyboard 106, although facilities may be provided via the graphical user interface to facilitate occasional text input using the graphics tablet 105 as well.

In addition to receiving image data from the tape player 101 and the frame store 102, the computer 103 may receive image and or other data over a network.

In a typical application, film clips are digitised and stored on digital tape for transfer to the system in FIG. 1. The film clips include several camera shots that are to be combined into the same scene. It is the task of the user or digital artist to combine and process this source image data to form a single output clip that will be stored onto digital tape for eventual transfer to film. Typical examples of this type of scene are where real images shot by a film camera are to be combined with artificially generated images and backgrounds, including scenes where actors are to be placed in a computer-generated environment.

Figure 2:
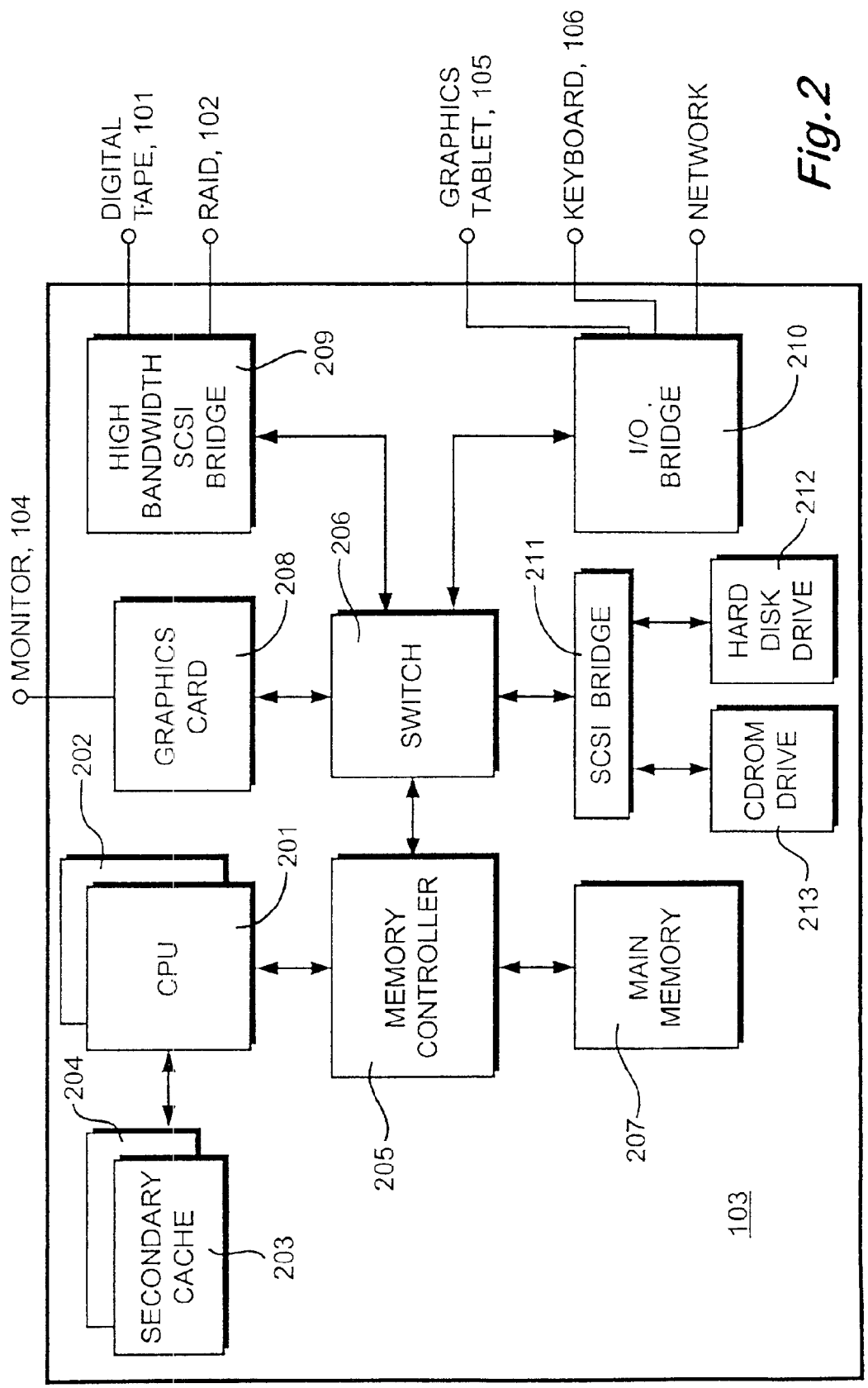
FIG. 2 details hardware components of the computer shown in FIG. 1, including a main memory and a hard disk drive.

The computer 103 shown in FIG. 1 is detailed in FIG. 2. Two MIPS R12000 central processing units (CPUS) 201 and 202 are configured to process instructions and data in parallel. Primary cache facilities are provided within each of the processors 201 and 202 in the form of a separate instruction and data cache. Both processors 201 and 202 are equipped with a one megabyte secondary cache 203 and 204. The CPUs 201 and 202 are connected via a memory controller to a switch 206 and a main memory 207. The main memory 207 comprises two gigabytes of dynamic RAM.

The switch 206 enables up to seven different non-blocking connections to be made between connected circuits. A graphics card 208 receives instructions from a CPU 201 or 202 in order to render image data and graphical user interface components on the monitor 104. A high bandwidth SCSI bridge 209 facilitates high bandwidth communications to be made with the digital tape player 101 or the frame store 102. An I/O bridge 210 provides input output interface circuitry for peripherals, including the graphics tablet 105, the keyboard 106 and a network. A second SCSI bridge 211 provides interface connections with an internal hard disk drive 212. This has a capacity of thirteen gigabytes. The second SCSI bridge 211 also provides connections to a CDROM drive 213, from which instructions for the central processing units 201 and 202 may be installed onto the hard disk 212.

Instructions for central processing units 201 and 202 determine how image data is processed. Several applications have been developed for image processing using hardware of the type shown in FIG. 2. The present applicant has image processing applications that include Batch (TM) and Inferno (TM). The name Batch will henceforward refer to an improved version of Batch, operating in accordance with the present invention.

Figure 3:
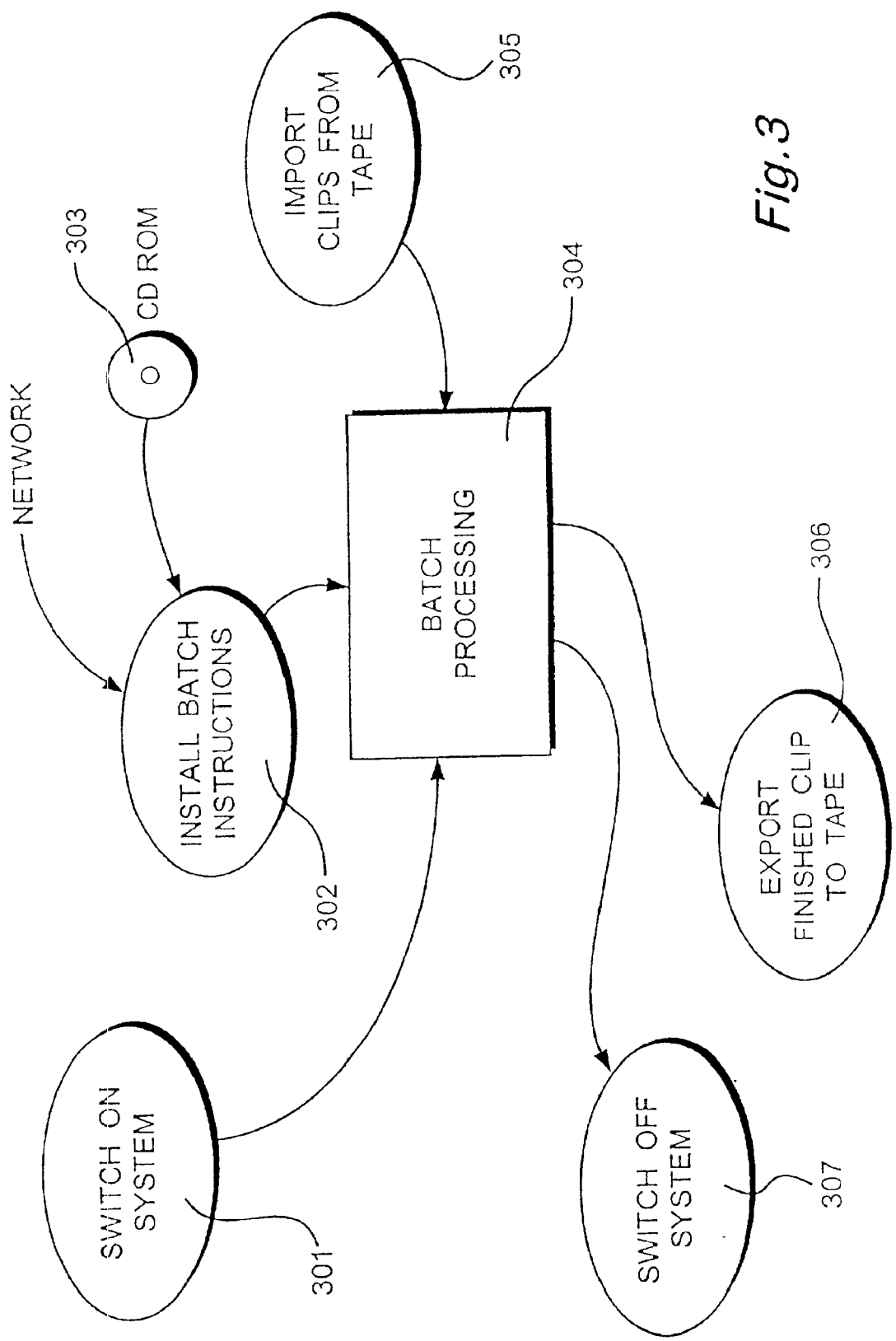
FIG. 3 details steps performed by the user of the system shown in FIG. 1, including a step of processing image data.

Steps performed by the user when operating the image processing system shown in FIG. 1 are detailed in FIG. 3. At step 301 the user switches on the computer 103 and logs on to their user account. If necessary, the user proceeds to step 302 in order to install Batch instructions onto the computer's hard disk 212. Instructions may be provided on a CDROM 303 via the CDROM drive 213, or over a network. Thereafter, control is directed to step 304, whereafter the instructions are executed by the CPUs 201 and 202. If starting on a new job, it will be necessary to obtain image data from film or video clips stored on digital tapes. This is done at step 305, where input clips are transferred from the tape player 101 to the digital frame store 102. Once a finished clip has been generated from the input clips, this is exported to tape at step 306. Alternative forms of import and export of image data may be performed as necessary, including transfer of image data over a network, transfer of image data from CDROM or transfer of data directly from a camera that may be connected to the input of a suitably equipped graphics card 208. Once finished using the image processing system, at step 307 the user logs off from their account and the computer and other equipment are switched off if necessary.

When composing a complex scene, the steps shown in FIG. 3 may be performed over a period of several days or weeks in order to produce a single output clip of a few minutes in length. On the first day, the user will import film material digitally, possibly from a variety of sources, and begin processing this image data. However, many days may pass before the finished clip is produced, and only at this time is the resulting clip transferred back to digital tape, for eventual transfer back to film. It is preferable, therefore, to provide facilities at step 304 such that as much image processing is performed as possible, and the finished clip generated at step 306 can be included in the final film of video sequence without further processing being necessary.

Figure 4:
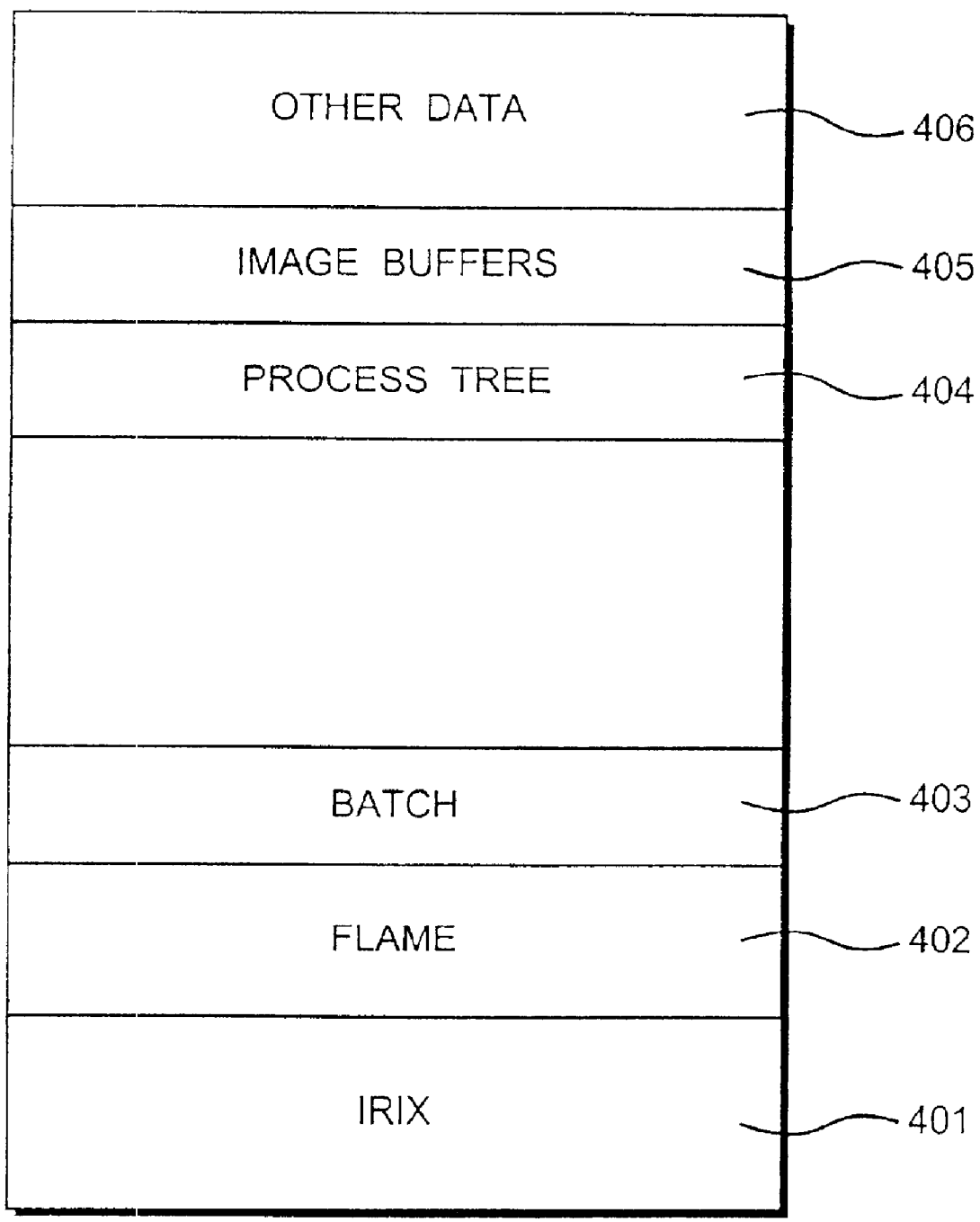
FIG. 4 details contents of the main memory shown in FIG. 2, including a process tree.

During Batch processing at step 304, the contents of the computer's main memory 207 shown in FIG. 2 are as detailed in FIG. 4. Common instructions for several simultaneously executing processes are provided in the form of an operating system 401. The operating system is the Irix (TM) operating system supplied by Silicon Graphics for use on the Silicon Graphics Octane computer 103. Inferno instructions 402 include high quality image processing modules, each of which includes instructions for processing image data in a particular way. These instructions may be used in an instruction environment generated by another module in the Inferno application, or alternatively the modules may be used in an environment generated by the Batch application 403. Batch 403 processes image data in accordance with a process tree data structure 404. Image buffers 405 are used for intermediate image data storage during image processing. Other data 406 includes areas of main memory 207 used by the operating system 401 and applications.

A particular Inferno 402 module that is used frequently in image processing is a color keyer module. In color keying, a first scene is shot by a film or video camera against a blue background. In the keying process, the background is identified by its color, and pixels of that color are replaced by pixels from a different image source. Color keying is used extensively in video and in digitally-processed film, in order to facilitate the creation of artificial environments. An example of this type of scene is the superposition of large numbers of actors from several different clips in a single artificially generated environment. In order to generate a scene of this kind, many color keyer modules are used for different parts of the image. Color keying is used in combination with other effects, such as masking, in order to improve the quality and realism of the resulting clip. For example, it may be necessary to apply scaling and color correction to clips of real actors in order to ensure that they have an appropriate size and orientation in the finished scene.

Figure 5:
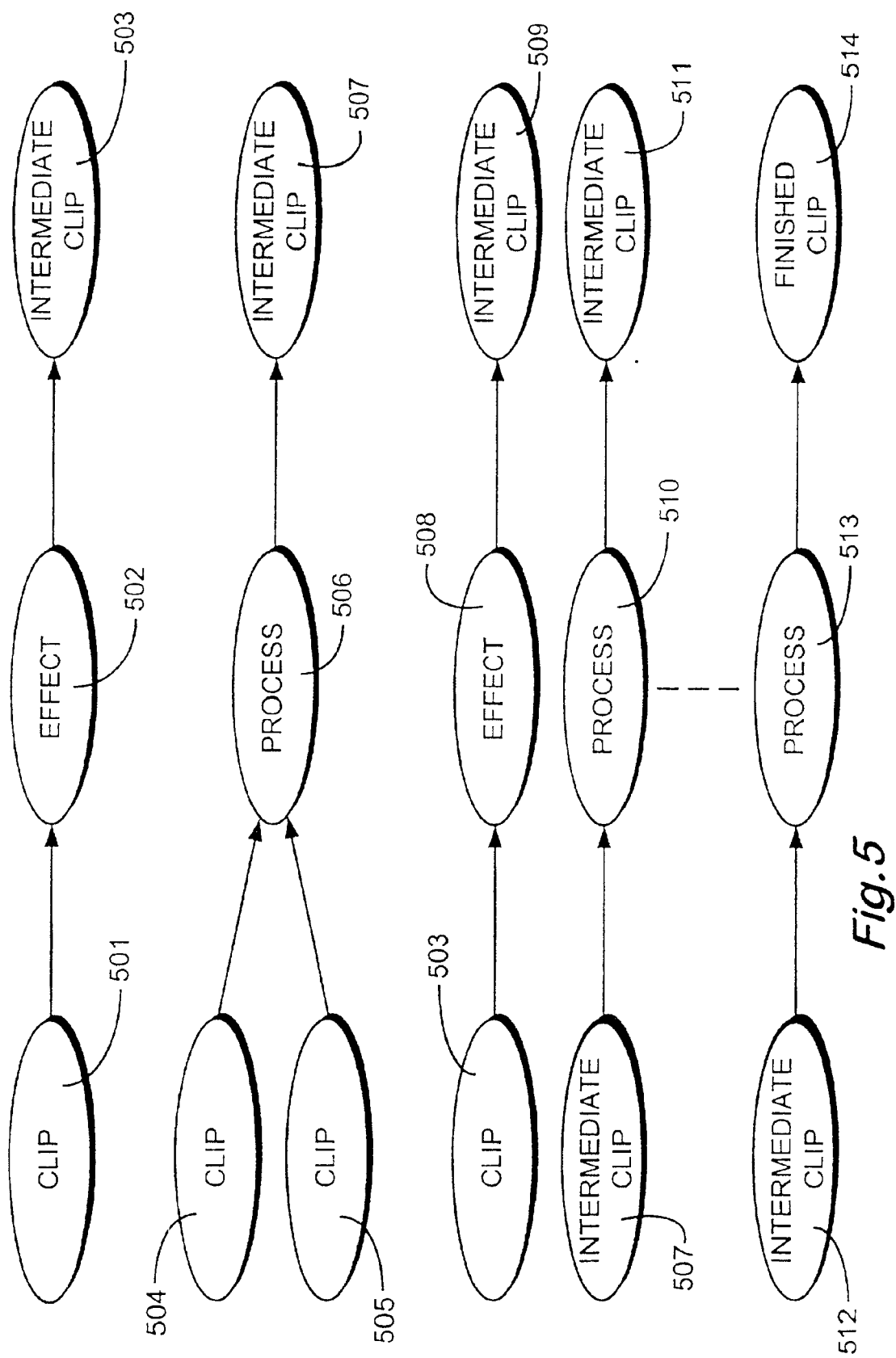
FIG. 5 details a known method of image processing in which intermediate clips are generated.

Historically, compositing a complex scene from multiple input clips has been performed in several stages. These are shown in FIG. 5. An input clip 501, originating from a film camera, is processed by an effect 502, such as scaling, to generate an intermediate clip 503. Input clips 504 and 505 may be combined by a process 506 such as a color keyer, to generate a second intermediate clip 507. The first intermediate clip 503 may then be processed by a different effect 508 to form a third intermediate clip 509. The second intermediate clip 507 is processed again 510 to form yet another intermediate clip 511. In this way many intermediate clips are generated. In a final stage, an intermediate clip 512, or possibly several intermediate clips, are processed 513 to form the finished clip 514.

Whether processed digitally or using some other method, the generation of intermediate clips after every stage results in considerable cost and time. It is also extremely limiting in a creative sense, because the artist responsible for the creation of the finished clip cannot see the results of early processing 502, 506, until long after this has been performed. This severely restricts the degree of experimentation that is possible, and thereby restricts the creativity of the artist.

The amount of storage required for intermediate clips 503, 507, 509, 511 can be prohibitive. A single digitised frame of film may take up as much as forty megabytes of data storage in the frame store 102. At twenty-four frames per second, and with many intermediate clips being generated, storage quickly becomes a limiting factor, with it soon becoming necessary to transfer intermediate clips to and from tape in order to facilitate the compositing of film clips of more than a few seconds in duration.

Figure 6:
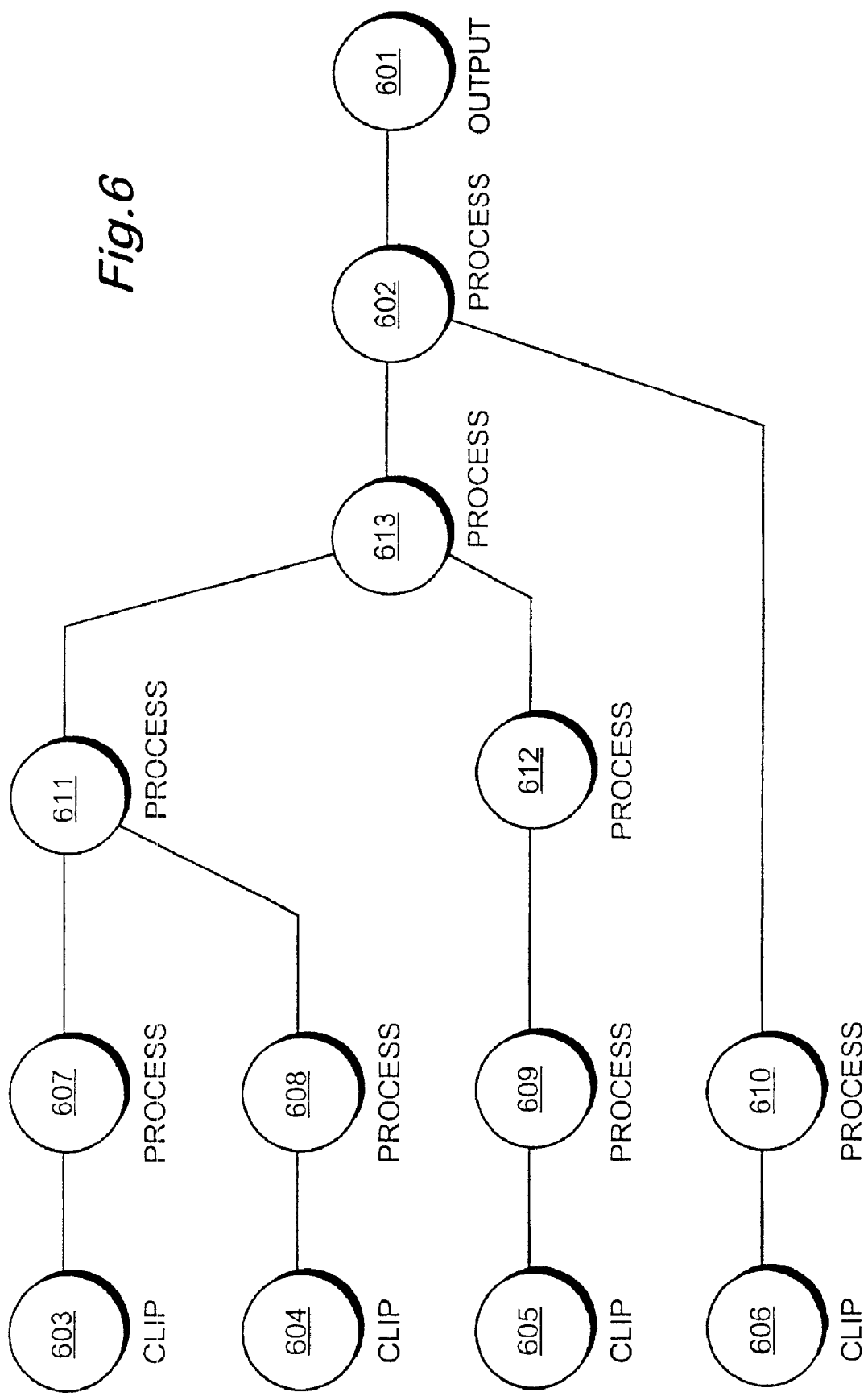
FIG. 6 details a data structure for controlling image processing in which intermediate clips are not generated.

Batch 403 provides a solution to this problem by processing intermediate image data 503, 507, 509, 511 on a frame-by-frame basis. The flow of image data from input clips to output clip is defined in a data structure 404 called a process tree. A process tree can be represented graphically as shown by the example in FIG. 6. Each process or effect, input or output is shown in the tree as a node 601 to 612. Connections between the nodes define the flow of image data one frame at a time. Each node generates a single frame of image data which is stored in an output buffer for the node which is stored in a region 405 of main memory 207 set aside for this purpose. The process tree defines a process pipeline for image data passing through it from left to right. When parallel processing techniques are used, it is possible to assign process nodes to be processed in parallel on multiple CPUs such as CPUs 201 and 202. The output clip is generated one frame at a time at an output node 601.

When generating each new frame of the output clip, a request for a new frame is passed from the output node 601 to process node 602. This requests two new frames from different paths in order to update its output buffer. Each path is considered in turn, resulting in a request for a new frame being transferred all the way to the input clip nodes 603, 604, 605 and 606. Thereafter, each process 607 to 613 is able to update its output buffer with valid image data for the next frame, and so, eventually, the output buffer of the output node 601 becomes valid for display.

As processing is performed a frame at a time, intermediate storage 503, 507, 509, 511 is reduced from being the length of an entire clip to the size of a single frame. Intermediate frames may therefore be stored in the image buffers 405 in the main memory 207 of the computer 103. When main memory 207 is insufficient, the operating system 401 uses virtual memory techniques to give the illusion of a larger main memory 207 by storing data temporarily on a hard disk drive.

The use of a process tree data structure 404 for processing image data facilitates complex combinations and modifications of input clips to be made while previewing the final results a frame at a time after a relatively short time delay required for performing the image processing at each of the process nodes. The versatility of this method encourages creativity, and enables an artist to experiment and composite clips that are many hundreds of times more complex than could be achieved with the method shown in FIG. 5.

Figure 7:
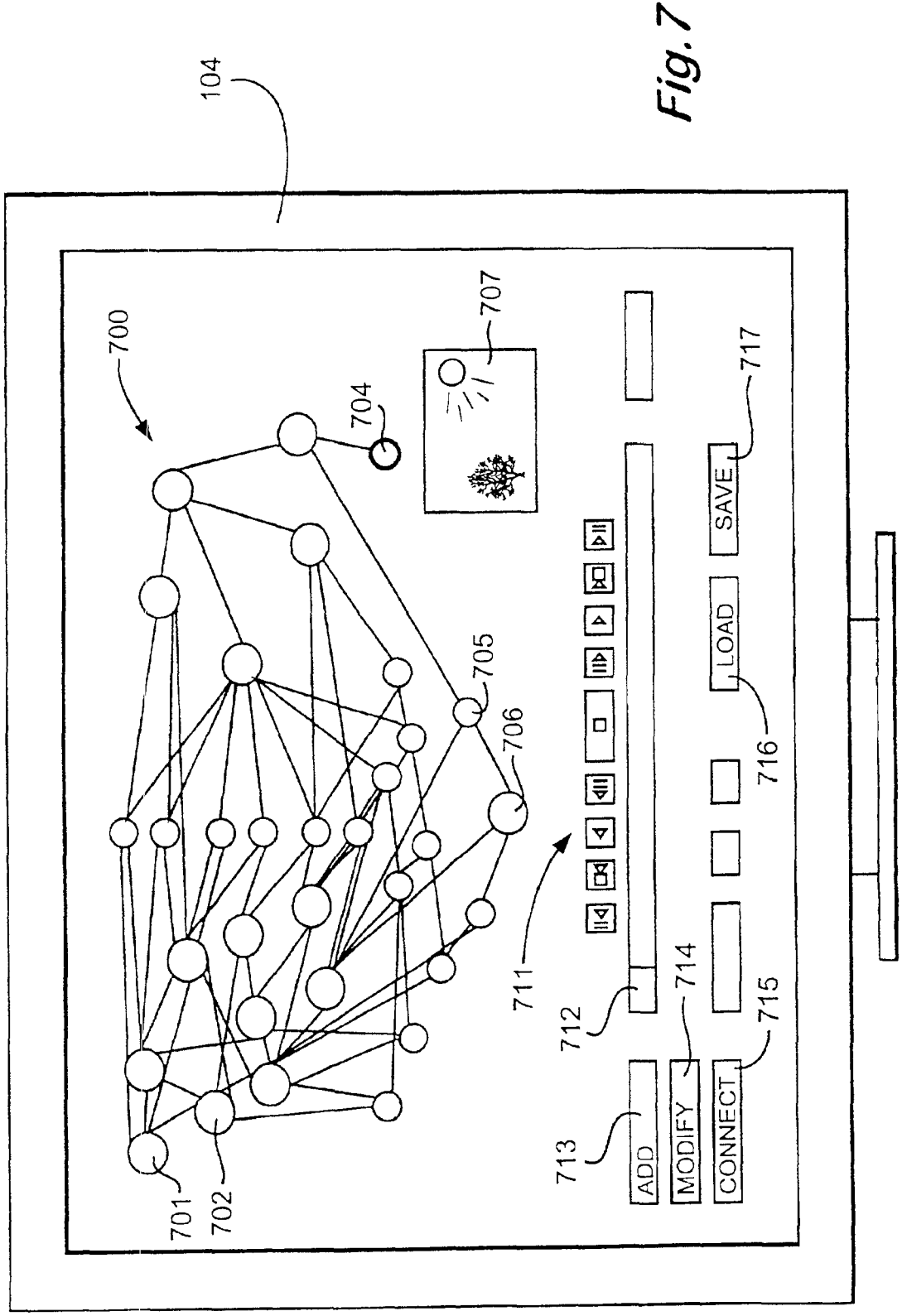
FIG. 7 shows a user interface displayed on the monitor shown in FIG. 1, including an interface to a data structure of the type shown in FIG. 6.

The interface presented on the monitor 104 when interacting with a process tree in Batch is shown in FIG. 7.

Input nodes 701 and 702 are processed in accordance with the process tree structure 404 to supply image data on a frame by frame basis to the output node 704. Many intermediate nodes 705 and 706 provide the effects and processes in the process tree. In the present embodiment, these effects and processes are supplied as modules of Inferno instructions 402, but these may instead be supplied as modules of instructions from any source, provided they conform to the requirements of the Batch application interface (API) for effects and processing modules. Output image frames are displayed in an image window 707, which may be resized and moved as required. The image window may be enlarged to fill as much of the screen as required, in order to check the quality of results in sufficient detail.

Other components of the user interface are transport controls 711, enabling the user to select frames for rendering, and to move quickly to any part of the final clip. A timeline 712 provides a graphical indication of the percentage of elapsed time through the output clip that is being generated. An add button 713 facilitates the addition of new process nodes 705, 706. A modify button 714 facilitates the modification of node functionality. Node modification typically results in new menus being provided to interact with the node's internal process or algorithm in great detail. A process node such as a color keyer node 705 may itself contain comprehensive user interface components that enable the user to make complex adjustments to achieve high quality results. User modification of a node may itself take a substantial amount of time. A connect button 715 facilitates connection between process nodes in the process tree. The functionality of buttons 713, 714 and 715 may be duplicated or replaced by keypress combinations on the keyboard 106 and or other methods of interacting directly with the process tree using the graphics tablet 105. Interaction with the user interface components is mainly achieved by using the graphics tablet 105 to position a cursor over the required soft button on the display and pressing a real button on the stylus used with the graphics tablet.

A load button 716 and a save button 717 are provided to save and load the process tree data structure 404 to and from the hard disk 212. Other user interface buttons are provided that enable the user to zoom into and out of the process tree 700, move nodes to generate a more easily viewed visual layout, and to access other sections of the Batch or Infero instructions, such as those required to import or export clips via the digital tape player 101.

The process tree data structure 700 defines operations carried out on a frame of data at a time. An advantage of the arrangement shown in FIG. 5 is that an effect 502 can modify the frame rate of image data supplied to it, in order to achieve slow motion, timewarp or standards conversion. The process tree in FIG. 6 in unable to perform this type of processing, as it renders image data at the output on a frame-by-frame basis. A process node that has different frame rates at its input and output cannot synchronise correctly with other parts of the process tree, because the process tree as a whole only considers a single frame at a time.

Figure 8:
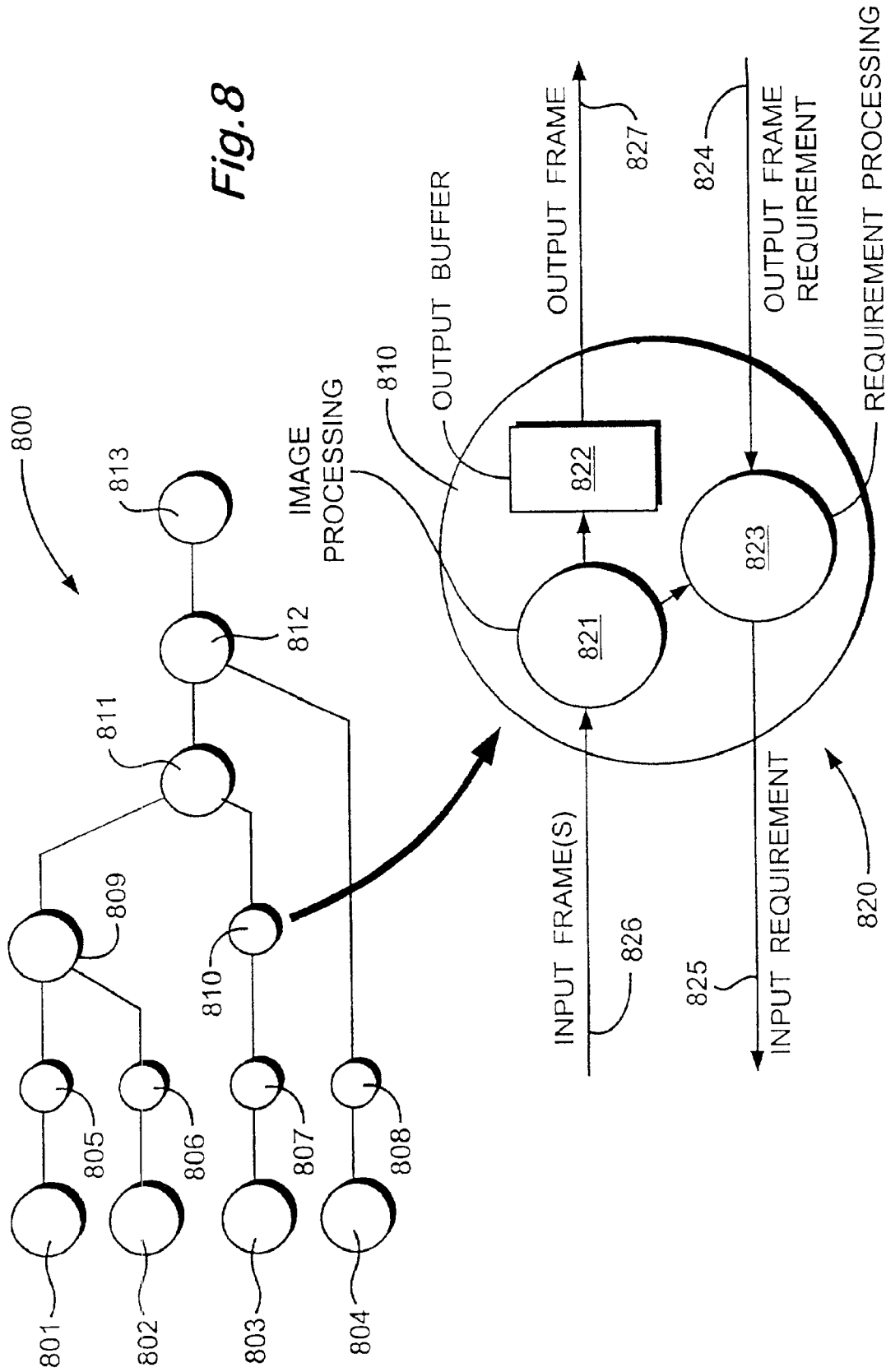
FIG. 8 illustrates the invention in relation to a process tree data structure of the type shown in FIGS. 7 and 8.

An improved process tree data structure operating in accordance with the present invention is illustrated in FIG. 8. A process tree 800 comprises input nodes 801 to 804, process nodes 805 to 812 and an output node 813. Process 810 is a timewarp node, in which the rate of frames supplied to it, from nodes 803 and 807, is different from the rate of frames supplied to the next process node 811. Process nodes having different input and output frame rates have additional processing in order to ensure that the process tree structure maintains consistency when different numbers of frames are requested in different parts of its structure.

The timewarp node 810 is detailed at 820. This includes image processing 821 that processes a frame or multiple frames of input image data. The result of processing is a single frame that is stored in an output buffer 822, that may be read from by the next connected node 811 in the chain, when the next node performs its image processing operations. In order to perform synchronisation of the parts of the process tree that are to supply data to the timewarp node, the timewarp node 810 includes requirement processing. This receives an output frame requirement 824 and processes this to generate an input frame requirement 825 that may include a requirement for multiple frames, a single frame or no frames at all. The requirement processing 823 receives information from the image process 821, that enables the requirement process 823 to identify frames that are required in order for image processing 821 to take place, to generate the next frame in the output buffer 822. Input requirements 825 are supplied to connected node 807, which generates a frame of image data 826. This process is repeated until node 807 has generated sufficient frames for image processing 821 to generate a single frame 827 of output data.

In the invention, each of the process nodes 805 to 812 includes requirement processing as indicated at 823. However, in the case where the input and output frame rates for a node are identical, requirement processing is reduced, and simply passes on a request 825 for a frame, whenever the output buffer 822 requires updating.

The interface summarised in FIG. 7 may be used to interact with a process tree operating in accordance with the present invention. Batch processing 304 shown in FIG. 3 is summarised in FIG. 9. At step 901 Batch is started. At step 902, button 716 is pressed and the user goes through a dialogue to select and load a process tree 404 into main memory 207. As an alternative, the user can create a process tree from scratch, by repeatedly using the add node button 713, in which case step 902 is replaced by loading an empty process tree. At step 903 modifications are made to the process tree while viewing the results of the modifications on the monitor 104. At step 904 the process tree is saved. The process tree includes all node and connection layout data, along with internal configuration data for each node in the process tree. At step 905 a question is asked as to whether the output clip is a finished clip. If so, control is directed to step 906 and the finished clip is rendered to tape, for possible eventual transfer to film. After rendering, or if the process tree 700 is still at an intermediate stage of configuration, control is directed to step 907, where the Batch session is ended.

Figure 9:
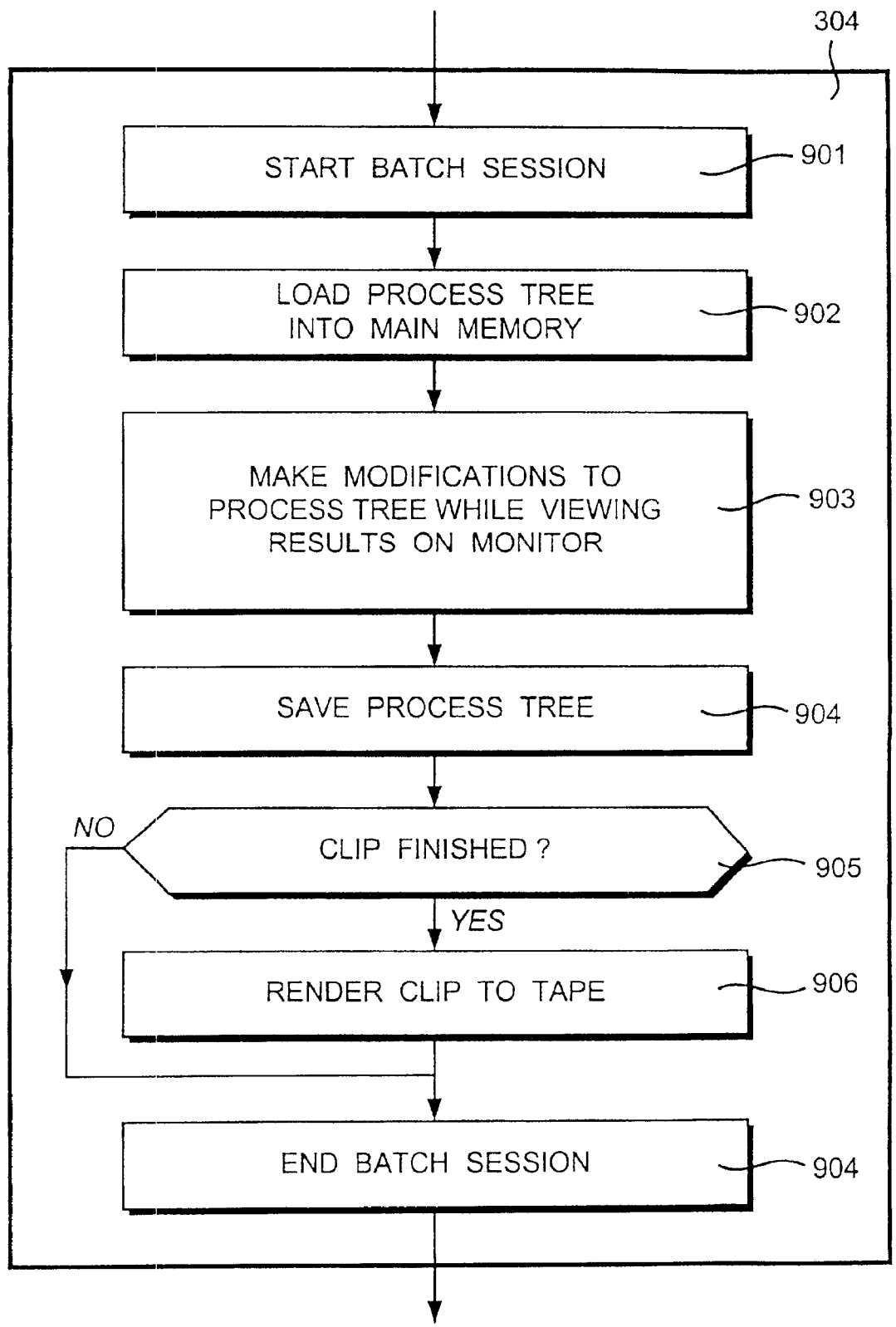
FIG. 9 details the step of processing image data shown in FIG. 3, including a step of making modifications to a process tree and viewing results.

Step 903 shown in FIG. 9 comprises a plurality of processes running substantially in parallel on the central processing units 201 and 202. Process 1001 includes user interface instructions to enable a user to modify a node's internal configuration. Process 1002 includes instructions to enable a user to modify connections to or from a node. Process 1001 and process 1002 both have the potential to affect image data that is being created at various parts of the process tree 700. Thus, after their execution, control proceeds to process 1003, where the next frame is rendered at the output 700. In contrast, the process 1004 of adjusting the position of a node 706 on the monitor's display area has no effect on the image data being rendered, and so there is no need to render after node positioning.

The need to render may be triggered by several different conditions. At 1005 a user requests a single frame to be rendered, by appropriate manipulation of the transport controls 711 via the graphics tablet 105. At 1006 an automatic request for a frame is generated. This will be due to a sequence of frames being rendered, each one immediately after the other. Even when only a single frame is being viewed, a change somewhere in the process tree must usually be reflected in a change to the preview image 707. This condition is indicated at 1007. After any of conditions 1005, 1006 or 1007 have been satisfied, control is directed to process 1004, where rendering is performed.

Figure 10:
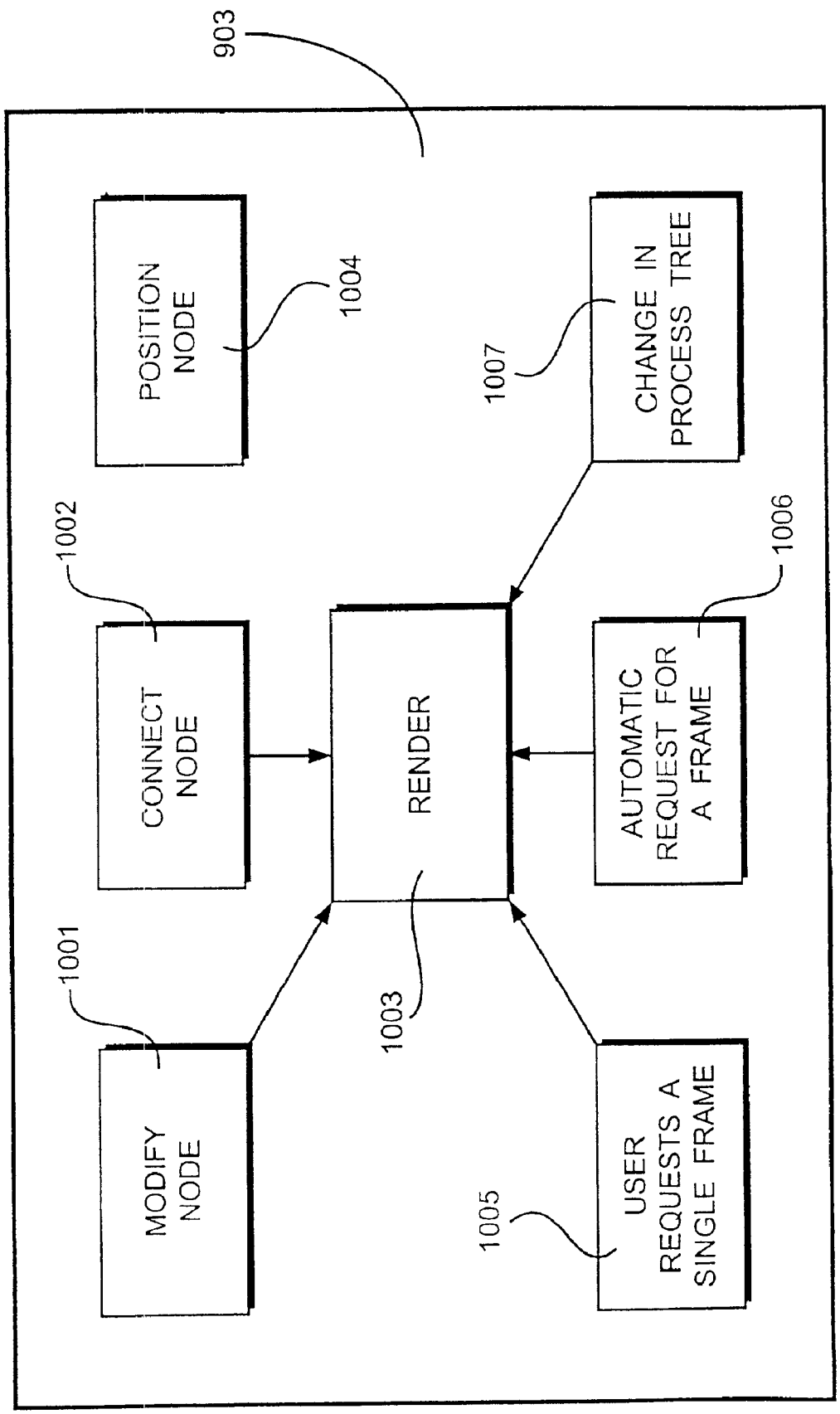
FIG. 10 details the step of making modifications shown in FIG. 9, including a step of rendering an image frame.
Figure 11:
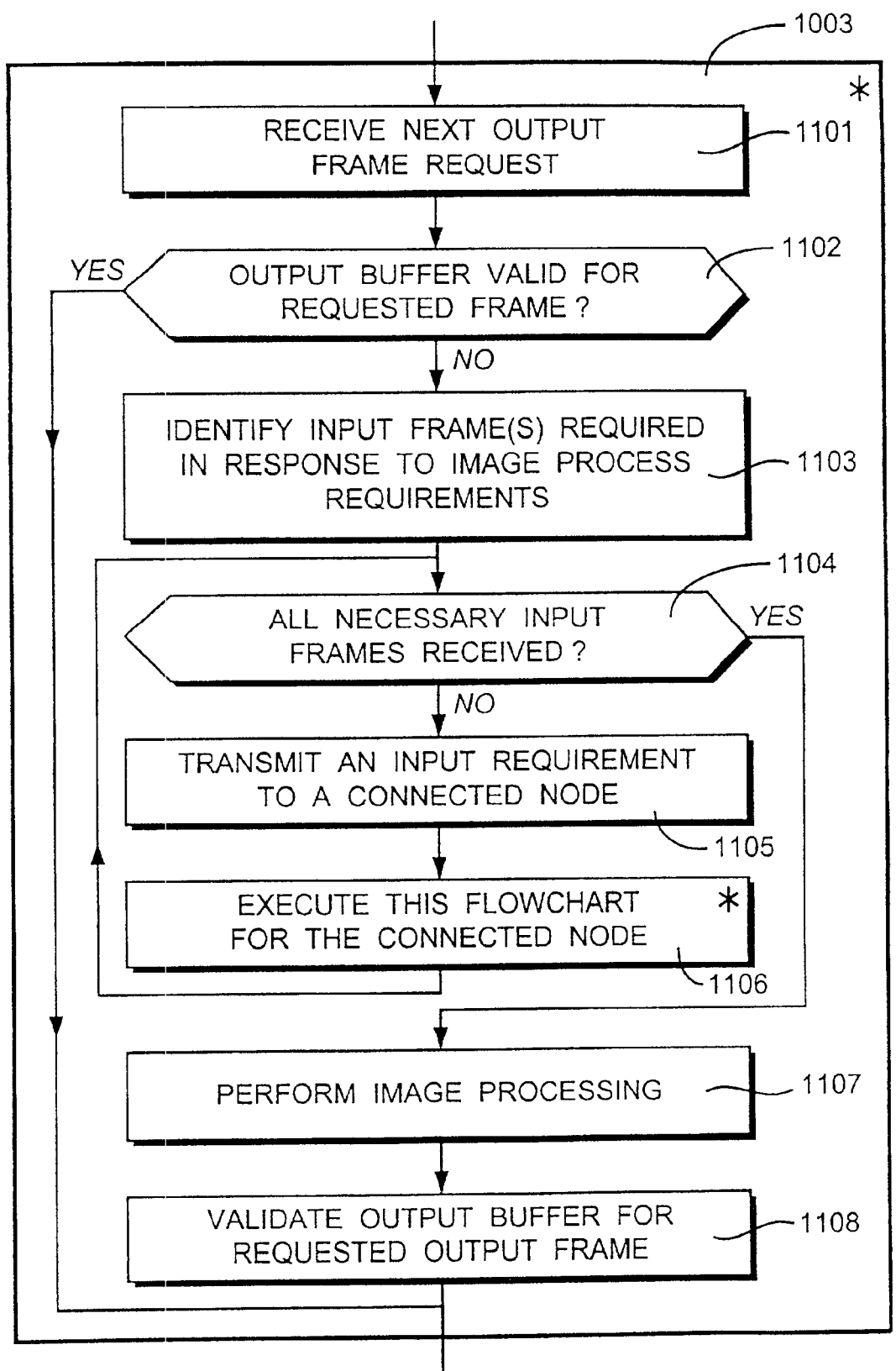
FIG. 11 details the step of rendering an image frame shown in FIG. 10, including a step of identifying input frames.

The rendering process 1003 shown in FIG. 10 is detailed in the flowchart shown in FIG. 11. FIG. 11 is a recursive flowchart, which calls itself, and its functionality is therefore dependent upon the context in which its steps are performed. The steps of FIG. 11 will be explained with reference to the process tree 800 shown in FIG. 8.

The render process 1003 commences with the application of the steps of FIG. 11 to the output node 813. Within the flowchart, the same steps are recursively applied to other nodes in the process tree 800, as necessary. At step 1101 the node receives an output frame requirement in the form of a request for a particular frame. The frame is requested by specifying a frame number, that is relative to the first frame of the output clip. This frame number is supplied to the requirement processing 823 of the selected node. At step 1102 a question is asked as to whether the output buffer 822 is valid for the requested frame number. If the output buffer contents are valid for that frame number, this completes rendering for the selected node.

Alternatively, if the output buffer 822 is not valid for the requested frame, control is directed to step 1103. At step 1103 the requirement processing 823 for the node identifies input frames required by the image process 821 in order to calculate a single output frame. For process nodes having a frame input output rate ratio of unity, only a single frame will be identified at step 1103, and this frame will have the same frame number as the output frame request received at step 1101.

At step 1104 a question is asked as to whether all necessary frames have been received by the image process 821. If so, control is directed to step 1107, where processing takes place. Alternatively, control is directed to step 1105. At step 1105, an input requirement is transmitted to a connected node. For example, from node 813 to node 812. At step 1106 the flowchart of FIG. 11 is executed with respect to the connected node identified at step 1105. For example, the flowchart is then executed with respect to node 812. Step 1106 exits with a frame having been received from the node identified at step 1105. Thereafter, control is directed back to step 1104, where a check is performed to see if all the required frames have been received. If not, steps 1105 and 1106 are repeated as necessary, until the image processing 821 has received all the input frames it requires in order to generate a single output frame for the contents of the output buffer 822.

Whenever the flowchart of FIG. 11 is called with respect to any particular node, eventually the output buffer 822 for that node will be updated by performing image processing at step 1107, and then validating the output buffer for the output frame request received at step 1101. When a process node such as node 811 has multiple inputs, each input is considered in turn by steps 1104, 1105 and 1106, until the required frames from both sources have been received and a single frame of output can be generated from these.

If a node has different input and output frame rates, requirement processing 823, performed by steps 1103 to 1106, ensures that as many or as few frames are requested as required by the image process 821. For example, if a slow motion effect is being performed by the timewarp process 810, the input frame rate will be lower than the output frame rate. Under these conditions, it may not always be necessary to obtain a new frame from node 807 for each frame that is generated, as the same input frames required for output of certain frame numbers will already have been pre-loaded into the image process.

The precise nature of frame requirements is dependent upon the processing algorithm that is being executed in the image process 821. Thus, step 1103 is different depending on the type of image processing that is being performed by a process node.

The timewarp process node 810 may perform slow motion or speed-up effects, depending upon a speed up factor F. Calculations performed at step 1103 for node 810 are summarised in FIG. 12. The node 810 receives an output frame request 824 as a frame number T, which is an integer. The speed up factor F has a fractional value. For values less than unity, slow motion occurs. For values greater than unity, a speed-up effect occurs.

Timewarping may be implemented in a variety of ways. In its simplest form, the input frame requirement is a single frame having integer value A. A is given by the integer portion of the product of FT. If F=0.35 and T=41, then A has the value 14. This frame number is then supplied as the input requirement 824 to the next connected node 807. Once image data 826 for this frame is received by the image process 821, the frame is simply passed to the output buffer. With T=0.35, frames in the sequence will repeat, and so step 1104 will ensure that no unnecessary image processing is performed by node 807 and possibly 803.

This is the simplest form of timewarp. For low values of T, the result is a visible jumping from frame to frame. In order to create true slow motion, some form of interpolation is required between frames, in order to generate an intermediate frame that has an appearance similar to what would have been seen if the camera had generated an image at that moment in time. In order to perform interpolation of this type, it is known to use a technique of motion analysis. At the very least, two frames are required, so that motion of objects from one frame to the next can be identified. When two frames are used, linear interpolation is performed between object start and end positions. Movement between start and end positions is determined by an interpolation control parameter. For linear interpolation, the two input frames A and B are given by the integer portions of FT and FT+1. The interpolation parameter has a value of greater than or equal to zero and less than one, and is given by the fractional portion of FT.

Figure 12:
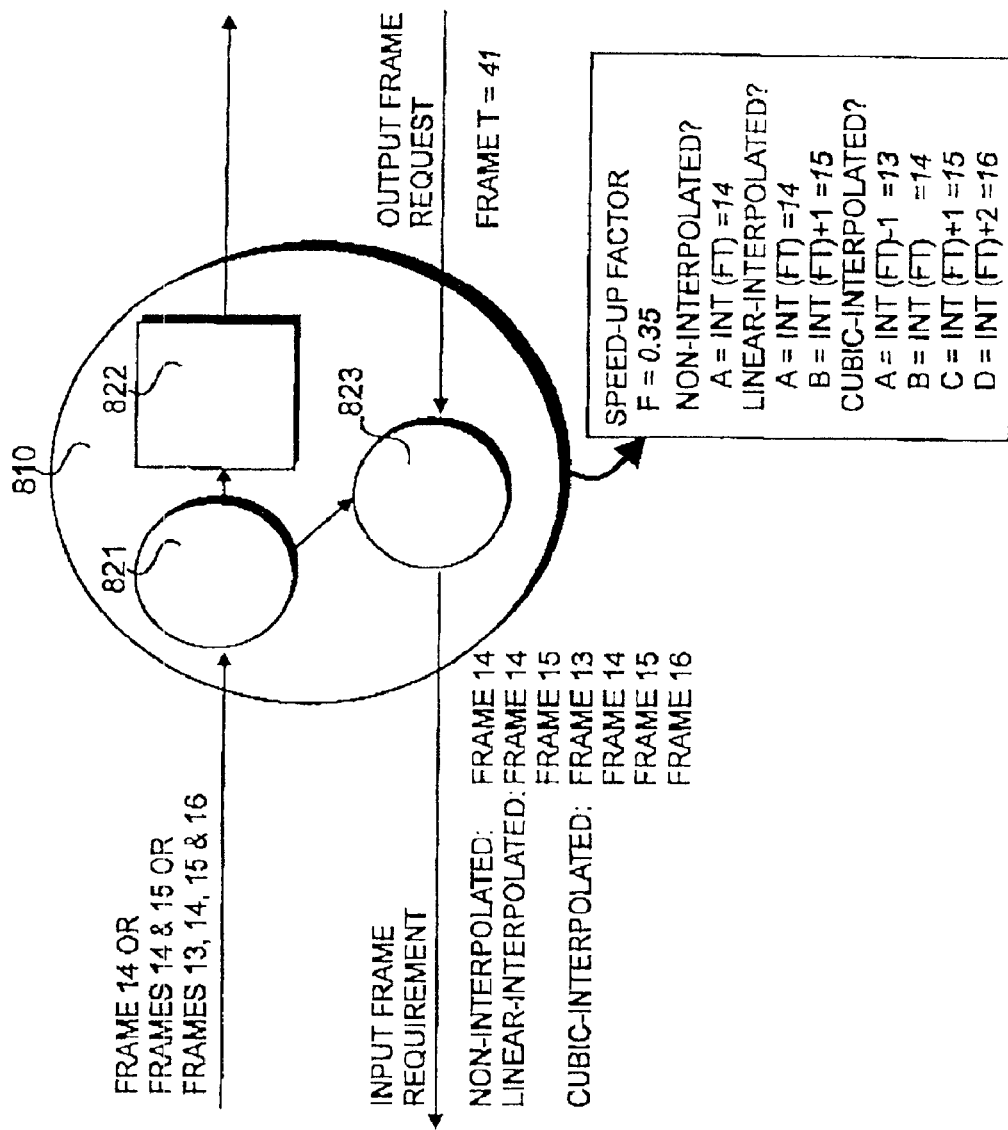
FIG. 12 details calculations performed at the step of identifying input frames shown in FIG. 11, with respect to a process of timewarping.

An improvement in interpolation is achieved where four or more input frames are analysed. Cubic interpolation can then be performed upon object movements tracked across these four frames, so that curved trajectories can be identified. Equations for input frames A, B, C and D, and the interpolation parameter, are shown at the bottom of FIG. 12.

Figure 13:
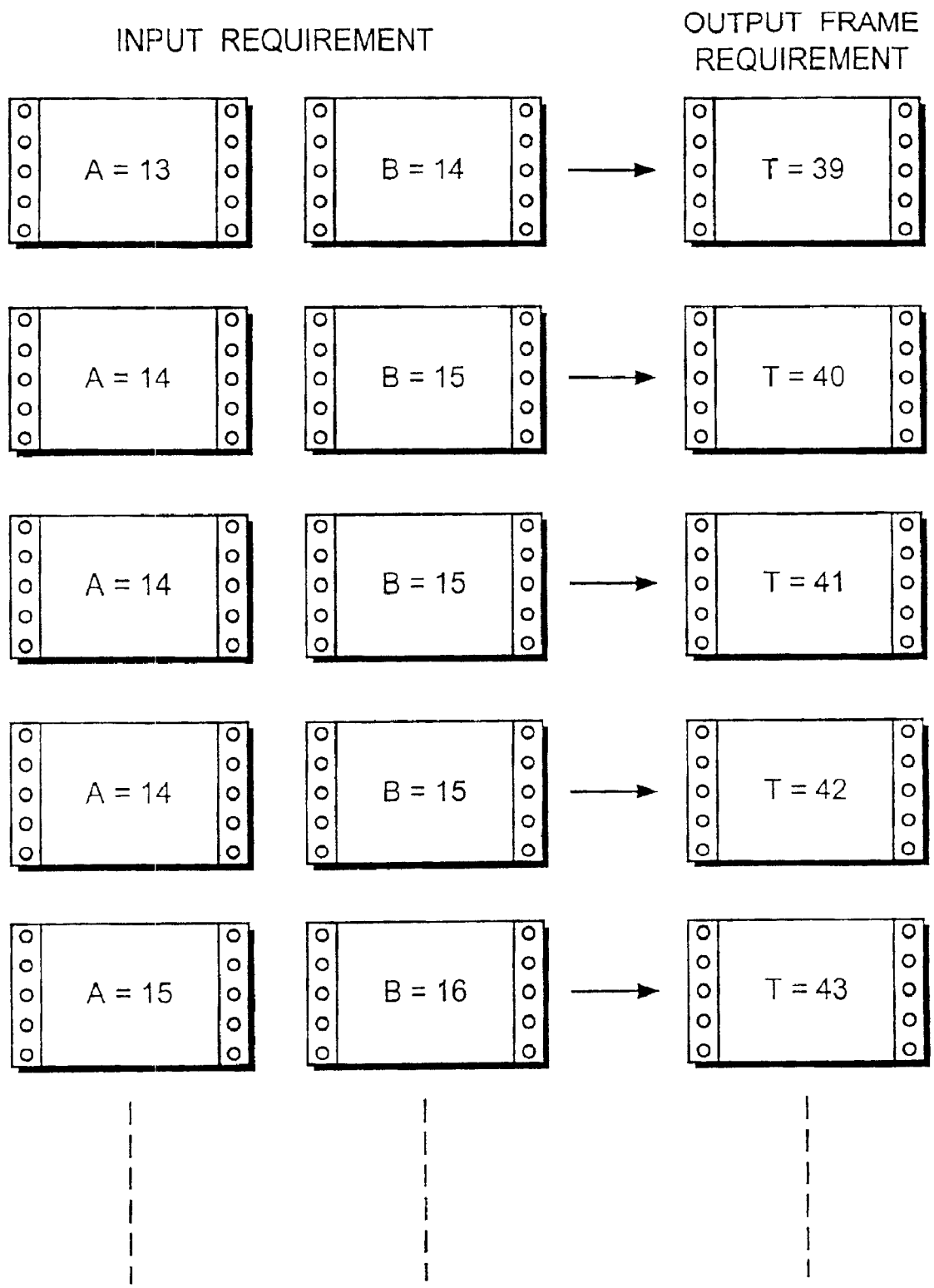
FIG. 13 illustrates the effect of the calculations shown in FIG. 12.

Relationships for linear interpolation between two input frames A and B, for a factor F of 0.35, are illustrated in FIG. 13. For output frame T=39, the input requirement is A=13 and B=14. For output frame T=40, input frames A=14 and B=15 are required. This is the same requirement for T=41, and so it can be seen that, for slow motion, the input frame requirements do not change as quickly as the output frame requirements.

A different type of process, also requiring different input and output frame rates, is standard conversion. For example, if input node 803 receives digitised frame data originating from film, this will probably have a frame rate of twenty-four frames per second (fps). Furthermore, each frame consists of an entire set of odd and even lines of pixels. This contrasts with video image frames, that are in an interlaced format. Film images are progressive, as opposed to interlaced. Hence, a popular film format is known as 24P. This format is increasingly being used for processing of images from a variety of sources, including video. When destined for broadcast, images filmed and digitised in 24P, require conversion to a video format, such as 30 fps interlaced. Thus, Process nodes 803 and 807 may operate on images in 24P format. However, node 810 converts these image frames to 30 fps interlaced, so that they may eventually be broadcast without additional processing.

Figure 14:
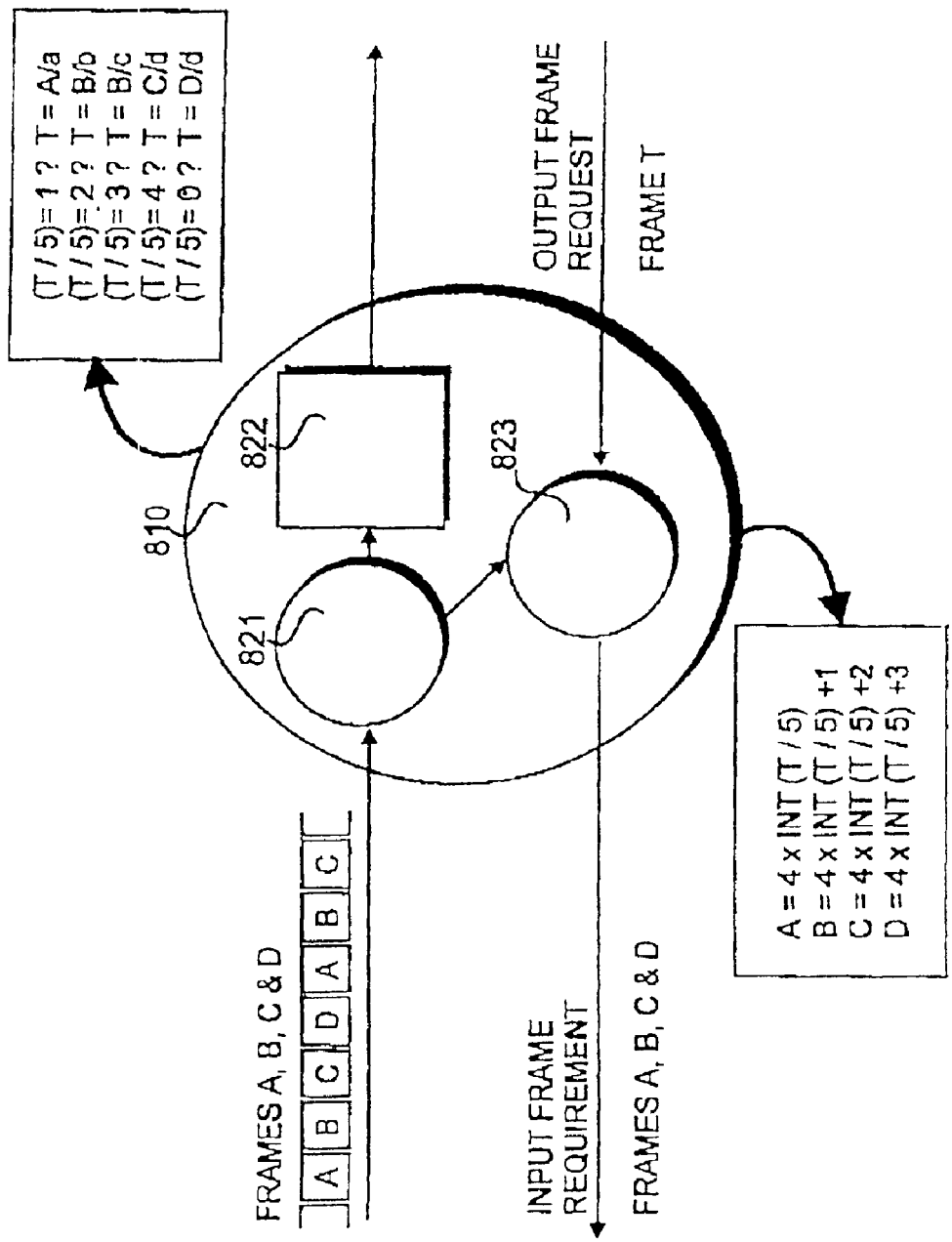
FIG. 14 details calculations performed at the step of identifying input frames shown in FIG. 11, with respect to a process of format conversion.

The identification of an input requirement performed at step 1103, as performed during conversion from 24P to 30 fps interlaced format, is detailed in FIG. 14. Input frames in 24P format are considered as being labelled A, B, C and D, sequentially. Frame values for A, B, C and D can be derived from an output frame requirement having frame number T according to the equations shown in FIG. 14. Frames A, B, C and D are each considered as comprising two fields, signified by uppercase and lowercase forms of their respective letters, ie A and a. Depending upon the details of the format conversion, these represent odd and even pixel lines, or vice versa, as is known in the art. From the four input frames A, B, C and D are generated five output frames given by A/a, B/b, B/c, C/d and D/d.

Figure 15:
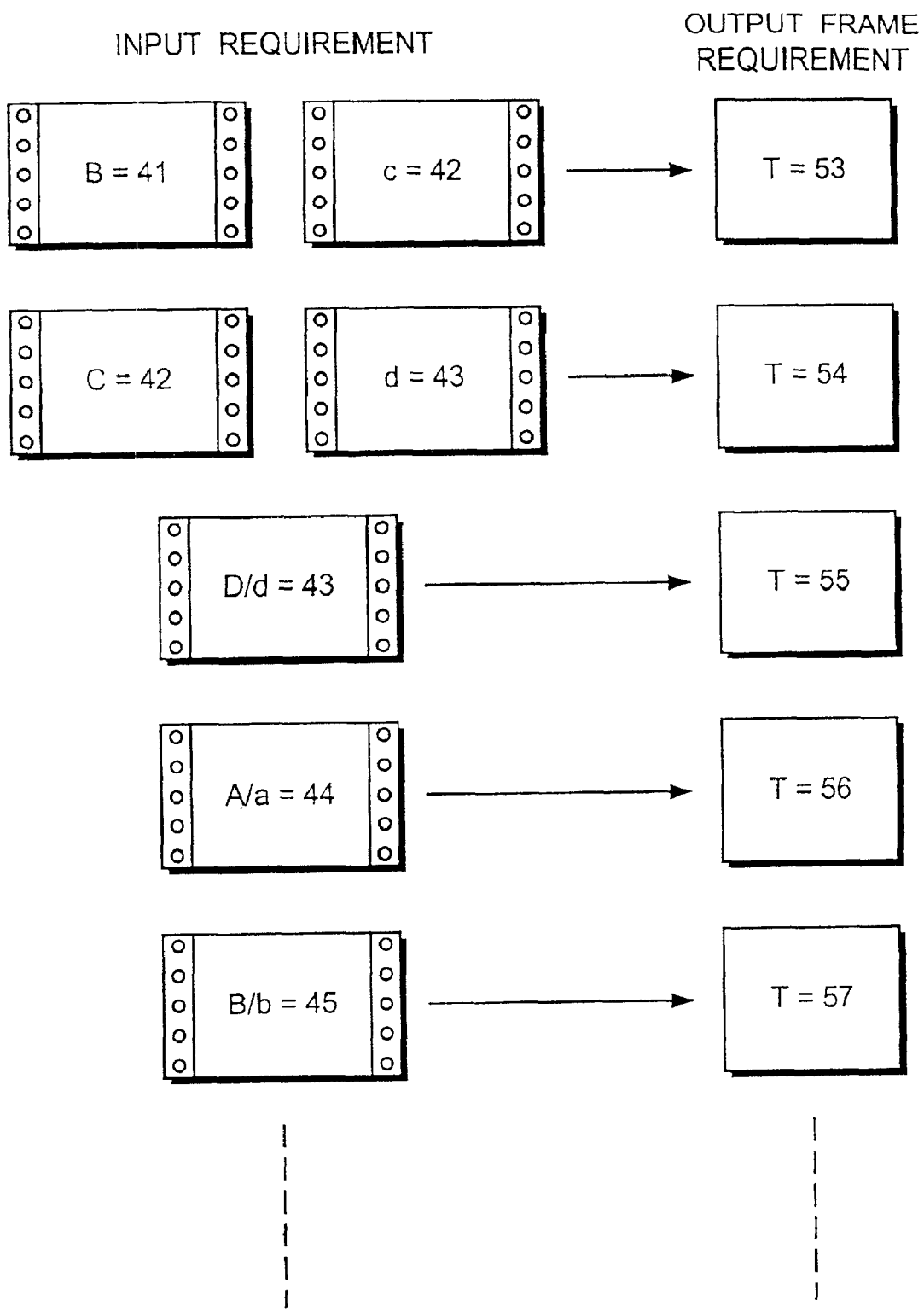
FIG. 15 illustrates the effect of the calculations shown in FIG. 14.

Examples of output frame requirements, and respective input requirements for 24P to 30 fps format conversion are illustrated in FIG. 15.

It will be understood that FIGS. 12, 13, 14 and 15 are given by way of example only, and the invention may be applied to any process requiring an input frame rate or frame rates that is or are different from its output or outputs frame rate or rates, when this process is or may be included in a process tree for processing image data.

What is claimed is:

1. Apparatus for processing image data comprising frame storage means for storing image data, memory means for storing instructions and a data structure representing processing to be performed on image data in said frame storage means, processing means for performing said image processing, said instructions defining a sequence of operations to be performed in order to process frames of said image data in a sequence of operations defined by said data structure, wherein said data structure comprises a process tree comprising an output node, at least one input node for receiving frames from said frame storage means, and a plurality of connected process nodes that request frames from other nodes by specifying a frame requirement, and said processing means is configured by said instructions to generate a single output frame by performing the following steps with respect to each process node;

(1) receiving an output frame requirement;

(2) in response to said output frame requirement, identifying an input requirement responsive to a ratio of frame input/output rates, when this ratio is other than unity, and wherein said input requirement identifies one or more input frames that are required to produce said single output frame that satisfies said output frame requirement; and (3) obtaining and processing said one or more input frames in response to said input requirement to generate said single output frame, wherein said processing is performed a frame at a time and only a single frame needs to be stored in intermediate storage during said processing.

2. Apparatus according to claim 1, wherein said frame requirements are specified by an offset from a start frame.

3. Apparatus according to claim 1, wherein said frame requirements are specified by a frame number.

4. Apparatus according to claim 1, wherein said input requirement is a requirement for a plurality of frames.

5. Apparatus according to claim 1, wherein said processing means is configurable such that said input requirement results in an output frame requirement being identified at another node.

6. Apparatus according to claim 1, wherein said processing means is configurable such that said input requirement results in a plurality of output frame requirements being identified at another node.

7. Apparatus according to claim 1, wherein said processing means is configurable such that said input node and said output node have different frame rates.

8. Apparatus according to claim 1, wherein a said process node performs a format conversion from 24P.

9. Apparatus according to claim 1, wherein a said process node performs a format conversion to 24P.

10. Apparatus according to claim 1, wherein said data structure includes a plurality of input nodes having a plurality of different frame rates.

11. A method of processing image data in an image processing system comprising frame storage means for storing image data, memory means for storing processing instructions and a data structure representing processing to be performed on image data in said frame storage means, processing means for performing said image processing, said instructions defining a sequence of operations to be performed in order to process frames of said image data in a sequence of operations defined by said data structure, wherein said data structure comprises an output node, at least one input node for receiving frames from said frame storage means, and a plurality of connected process nodes that request frames from other nodes by specifying a frame requirement;

a single output frame is generated by performing the following steps with respect to each process node:

(1) receiving an output frame requirement;

(2) in response to said output frame requirement, identifying an input requirement responsive to a ratio of frame input output rates, when this ratio is other than unity, and wherein said input requirement identifies one or more input frames that are required to produce said single output frame that satisfies said output frame requirement; and (3) obtaining and processing said one or more input frames in response to said input requirement so generate said single output frame, wherein said processing is performed a frame at a time and only a single frame needs to be stored in intermediate storage during said processing.

12. A method according to claim 11, wherein said frame requirements are specified by an offset from a start frame.

13. A method according to claim 11, wherein said frame requirements are specified by a frame number.

14. A method according to claim 11, wherein said input requirement is a requirement for a plurality of frames.

15. A method according to claim 11, wherein said input requirement results in an output frame requirement being identified at another node.

16. A method according to claim 11, wherein said input requirement results in a plurality of output frame requirements being identified at another node.

17. A method according to claim 11, wherein said input node and said output node have different frame rates.

18. A method according to claim 11, wherein a said process node performs a format conversion from 24P.

19. A method according to claim 11, wherein a said process node performs a format conversion to 24P.

20. A method according to claim 11, wherein said data structure includes a plurality of input nodes having a plurality of respective frame rates.

21. A computer-readable medium having computer-readable instructions for processing image data on an image data processing system comprising frame storage means for storing image data, memory means for storing said instructions and a data structure representing processing to be performed on image data in said frame storage means, processing means for performing said image processing in response to said instructions, said instructions defining a sequence of operations to be performed in order to process frames of said image data in a sequence of operations defined by said data structure, wherein said data structure comprises a process tree comprising an output node, at least one input node for receiving frames from said frame storage means, and a plurality of connected process nodes that request frames from other nodes by specifying a frame requirement; and said instructions enable said processing means to generate a single output frame by performing the following steps with respect to each said process node;

receive an output frame requirement;

in response to said output frame requirement, identify an input requirement responsive to a ratio of frame input output races, when this ratio is other than unity, and wherein said input requirement identifies one or more input frames that are required to produce said single output frame that satisfies said output frame requirement; and obtain and process said one or more input frames in response to said input requirement to generate said single output frame, wherein said processing performed a frame at a time and only a single frame needs to be stored in intermediate storage during said processing.

22. A computer-readable medium according to claim 21, including instructions such that said frame requirements are specified by an offset from a start frame.

23. A computer-readable medium according to claim 21, including instructions such that said frame requirements are specified by a frame number.

24. A computer-readable medium according to claim 21, including instructions such that said input requirement is a requirement for a plurality of frames.

25. A computer-readable medium according to claim 21, including instructions such that said input requirement results in an output frame requirements being identified at another node.

26. A computer-readable medium according to claim 21, including instructions such that said input requirement results in a plurality of output frame requirements being identified at another node.

27. A computer-readable medium according to claim 21, including instructions such that said input node and said output node have different frame rates.

28. A computer-readable medium according to claim 21, including instructions such that a said process node can perform a format conversion from 24P.

29. A computer-readable medium according to claim 21, including instructions such that a said process node performs a format conversion to 24P.

30. A computer-readable medium according to claim 21, including instructions for processing image data in response to said data structure, wherein a plurality of input nodes in said data structure have different frame rates.

31. The apparatus of claim 1 wherein each process node is further configured to combine two or more input frames from a plurality of sources.

32. The method of claim 11 wherein each process node is further configured to combine two or more input frames from a plurality of sources.

33. The computer readable medium of claim 21 wherein each process node is further configured to combine two or more input frames from a plurality of sources.

* * * * *

UNITED STATES PATENT AND TRADEMARK OFFICE
CERTIFICATE OF CORRECTION

PATENT NO. : 6,924,821 B2
DATED : August 2, 2005
INVENTOR(S) : Trinh et al.

It is certified that error appears in the above-identified patent and that said Letters Patent is hereby corrected as shown below:

Column 12,
Line 65, "races" should read -- rates --.

Signed and Sealed this

Twenty-seventh Day of December, 2005

JON W. DUDAS
*Director of the United States Patent and Trademark Office*